United States Patent Office 3,031,345
Patented Apr. 24, 1962

3,031,345
METAL ARC WELDING, COMPOSITION, AND METHOD OF MAKING SAME
Arthur E. Shrubsall, Niagara Falls, N.Y., Gerard E. Claussen, Summit, N.J., Norman G. Schreiner, Philadelphia, Pa., and Clarence E. Jackson, Berkeley Heights, N.J., assignors to Union Carbide Corporation, a corporation of New York
No Drawing. Filed Dec. 5, 1958, Ser. No. 779,515
3 Claims. (Cl. 148—24)

This invention relates to metal arc welding and more particularly to submerged arc welding of the type involved in the Jones et al. Patent No. 2,043,960.

Fabricators of welded structures are interested in applying the submerged arc welding process to all types of steels. To satisfy this need several grades of welding compositions are available for the welding of most carbon steels and for low-alloyed steels. Some compositions are applicable to stainless steels. A problem in welding most steels is the surface condition of the plate. Hence, it becomes important, in view of prohibitive costs of cleaning and machining, to be able to weld standard plate that is usually oxidized or rusty. Thus, if scaled or rusty plates can be welded directly, without an expensive cleaning preparation, the fabricator would be in a good competitive position for this finished product.

Standard welding composition grades are suitable in welding most types of steel, but rusty or heavily-scaled steels are troublesome. Alloys of the deoxidizer type are sometimes placed in the composition to compensate for such conditions.

A weld on a heavily-scaled plate may be unsatisfactory in that the weld edges become undercut and the weld surface is not of the usual smoothness. Rusted plate presents the problem of an oxide on the plate surface which contains combined oxygen plus mechanically entrapped water. Thus, where there is surface rust of a fairly heavy nature, welds may be produced which have centerline porosity or a general porosity throughout the depth of the weld itself. One explanation of such porosity is that the high temperature of the arc dissociates the water into its gaseous components, oxygen and hydrogen. As the weld solidifies, these gases are entrapped forming cavities or porosity.

The extent of the porosity is affected by the depth of the weld. For example, the porosity condition can vary in the weld; that is, if the weld is thin, the porosity will be close to the top surface. However, if the weld is fairly thick and the rust fairly heavy, the porosity can extend completely through the weld thickness.

The primary aim of this invention is to overcome such problems and difficulties.

Briefly, according to the invention, there is provided a novel process of making metal arc welding composition which comprises melting a metal oxide or oxides, and reducing the latter by maintaining such metal oxide in a molten state in the presence of a reducing agent only until and not later than some of the metal oxide is reduced to metal in the form of microscopically small inclusions that are distributed by suspension in the melt as a "mist" or dispersion throughout the remaining oxidic material. The so-fused melt is then solidified by rapid cooling to freeze such mist in situ to prevent the settling of such inclusions by gravity. The resulting solid is finally crushed and sized to a screen range of between 4 mesh and minus 325 mesh, inclusive.

Such process results in a novel composition comprising solid particles each of which is composed of metal in the form of microscopically small masses substantially evenly distributed as a mist throughout a solid matrix composed of metal oxide. The metal arc welding composition of the invention comprises metal oxide selected from class consisting of manganese and silicon oxide, and metal selected from class consisting of manganese, silicon and iron. As a result the composition is unexpectedly effective in producing sound welds on steel work containing heretofore deleterious quantities of iron oxide encountered in metal arc welding, which in the past required expensive cleaning prior to welding. A characteristic of such composition is that the microscopically small spheres of metal are formed within the metal oxide matrix by chemical reduction.

Further, according to the invention there is provided a novel method of metal arc welding which comprises striking a welding arc between a consumable metal welding electrode and a steel workpiece, and covering such arc and the adjacent metal with such novel welding composition. The composition and metal are melted by said arc, and the microscopically small inclusions are released by fusion of the metal oxide matrix at a substantially uniform rate as the welding operation progresses to combine with oxygen unavoidably derived from air mixed with the composition and with oxygen derived from the surfaces of and from within the workpieces and electrode, leaving weld metal that is sound and of good appearance.

Submerged arc welding is a process wherein a welding composition and a consumable metal electrode, through which an electric welding current is flowing, melt within the confines of the joint. The composition forms a slag over the fused metal of the electrode, protecting and molding it to a desired shape. Typical functions of such composition are to stabilize the arc and confine spatter. Such welding composition, by stabilizing the arc, allows the use of much higher currents than are feasible with other arc welding processes. The welding composition of the invention also has a metallurgical effect wherein the characteristics of the weld deposit can be controlled by the proper choice of electrode composition, thereby adjusting the electrode composition to the base metal. The constituents of the welding composition govern the character of the welded product to a substantial degree.

An unexpectedly novel and useful feature of the present invention is the fact that the metal inclusions in the metal oxide matrix may be used to supply and control alloying elements in the resulting weld. For example, a welding composition of this type, made from a batch containing 4 to 5 percent chromium oxide, when used with a welding electrode containing essentially zero chromium, will produce weld metal containing about one percent chromium. The chromium oxide in the batch is partially converted during furnacing into a metal mist containing a large percentage of chromium. Chromium in this form is more efficiently transferred to the weld metal than chromium which remains in the oxidic form, although the gross chromium content of the respective welding compositions would be identical. Other alloying mist metals are manganese, silicon, iron, molybdenum, nickel and cobalt.

The submerged weld puddle of the invention may be likened to a miniature arc smelting furnace, the electrodes being steel instead of carbon. The molten weld metal is in contact with a slag as is the molten metal in the arc furnace. In the arc furnace the metallurgist adjusts the composition of his steel by additions to the slag. In the weld puddle, the welding operator cannot make additions to the slag in the course of welding but is restricted to using the welding composition with which he is supplied. The welding operator is limited by the comparatively short time involved in welding to such an extent that any additions made to the welding composition must be made before it is introduced into the weld. In other words, the manufacturer of the welding composition must supply all additions mixed or incorporated in the flux.

The additions that the steel maker makes to his slag may be divided into three general classes: (1) oxidizing, (2) reducing, and (3) alloying. Oxidizing additions are used to lower the carbon, manganese and silicon content of the steel. Chemical reduction additions are used to remove oxygen from the steel. Alloying additions are made to combine with sulphur in the steel and to provide desired physical properties. In welding compositions the second and third functions are most important. The alloying functions are important in welding to overcome impurities in the steel and electrode as well as to develop specific chemical properties in the weld metal. The "reducing power" of the welding composition is important to counteract oxides present on the metals to be welded.

Therefore, it is one of the principal objects of the invention to provide a composition containing an effective "reducing power" which provides unexpectedly new results in the melting and control of various metal bodies. Another object is to provide a fused oxide composition substantially free of higher oxides of Fe, Mn, Cr, Ni, Mo, Co, Si, Cu, and containing free metal mist composed of at least one of such metals and in sufficient quantity to provide "reducing power" sufficient to remove oxygen from the weld zone which may be present or free oxygen from the atmosphere or iron oxide scale or moisture in the weld zone.

In chemistry, reduction involves the lowering of the valence of the element involved. One effect of metal mist is to lower the percentage of oxygen in the welding composition mixture. If the composition is subjected to a reducing operation FeO is formed in it and the chemical "reducing power" is expressed as the percentage of FeO present. The "reducing power," as it is to be understood in this disclosure, signifies the presence in the composition of metals that can effect the chemical reduction of iron oxide. Metals in this classification are silicon and manganese. Such metals are provided in the composition to combine with oxygen present in or on the surface of the steel plate and electrode. A further function of these metals is to provide sufficient silicon and manganese for safety against sulphur cracking.

Fused welding compositions generally consist of a mixture of oxides of elements such as calcium, aluminum, magnesium, silicon, manganese and iron. The welding composition of the invention is furnaced to the extent of containing iron, silicon, or manganese in the form of particulates of metal disclosed herein for the first time as metal mist. The chemical "reducing power" distinguishes between the valences of the oxidized metal. For iron, the reduced conditions is bivalent iron, and the oxidized condition is trivalent iron. The "reducing power" of the invention carries the valency of iron to zero. This signifies that iron in the form of metal is present in the flux. This same explanation applies to manganese, silicon, and chromium. The fused conventional welding compositions of the prior art have been plagued with the difficulty of welding on oxidized steel, which is so common, because it produces porosity and/or surface defects. In turn, welding fabricators have been plagued with the welding difficulties associated with inadequate chemical reduction effect of the welding composition and have had to overcome such difficulties by the use of expensive alloy steel electrodes which offer only a partial solution to the difficulty.

The incorporation of alloying elements in the composition has been found to provide a better solution. The composition containing metallic additions has been used heretofore only in bonded form, by the mixing of non-metallic materials with metallic materials and causing adhesion between the two by a bonding agent such as waterglass. The metallic additions to the welding composition of the invention are produced in the fused state. No bonding agent is required. The finely dispersed metals are generated from the furnace bath itself and are not added to the bath as metallic materials, thus differentiating from the prior art. The dissemination of metallic particles in the flux is on a very fine scale, much finer in general than can be achieved by bonding. The result of such dissemination of fine particles is referred to herein as metal mist.

It is interesting to make a comparison between standard ferro-alloy production-in-furnace and the production of the welding composition of the invention in an arc furnace. Such comparison is made to illustrate the principles involved in the process of this invention. In the ferrosilicon furnace, a siliceous fusion is prepared by means of a carbon arc. The carbon arc reduces the silica in the fusion to silicon. The silicon separates by gravity from the fusion and forms a layer of ferrosilicon on the bottom of the furnace. In the production of ferromanganese, likewise a fusion containing a high percentage of manganese oxide is melted by the carbon arc. The temperature is controlled to the point at which the manganese oxide is reduced to metallic manganese. Such manganese (like the silicon) separates from the fusion by gravity and forms a layer of ferromanganese on the bottom of the furnace. This comparison applies not only to an arc furnace, but to furnaces of blast furnace or cupola type utilizing coke as reducing agent.

Essentially the same procedure is adopted in the present invention except that the process is stopped before an appreciable layer of alloy is formed on the bottom of the furnace. The temperature and energy input to the fusion are controlled so that the particulates of metal remain in suspension in the fusion and so become a part (mist) of the welding composition. The important factors governing the production of metal mist have been found to be (1) the temperature, (2) the viscosity of the bath, (3) the time at temperature, (4) the existence of electric arc currents in the fusion to promote suspension, and (5) the composition of the bath.

Mists were made in a graphite-lined arc furnace of 20 lb. capacity. Two electrodes furnished an arc operating at 600 amperes, 80 volts A.C. The materials were charged into the furnace and were melted by the arc. Upon completion of melting, additional energy was introduced into the fusion before the product was cast. Casting involved pouring the contents of the furnace onto a cold steel chill plate. The materials used depended upon the type of welding composition to be produced. The materials for one series of tests consisted of:

FORMULA NO. I

| | Percent |
|---|---|
| Lime | 9.3 |
| Calcined bauxite | 12.0 |
| Calcined dolomite | 11.9 |
| Silica sand | 39.2 |
| Grade C manganese ore | 24.8 |
| Calcium fluoride | 2.9 |

Such materials were fused at levels of energy input as shown in Table I.

Table I
EFFECT OF ARC FURNACE ENERGY ON PRODUCT AND WELDING

| Color of Glass 12 x 150 | Kw. hr. per lb. of Charge | Time of Furnace, Minutes | Metal Mist in Product | Weld (Tests) Electrode [1] | | Manganese Content of Weld, Percent | Silicon Content of Weld Metal |
|---|---|---|---|---|---|---|---|
| | | | | 500 amp. 12 x 150 | 1,100 amp. 12 x 150 | | |
| gray | +0.65 | +36 | heavy | speckled bead | no herring bone | 0.54 | 0.15 |
| green | 0.30 | 19 | fine | no defects | | 0.40 | 0.13 |
| green gray | 0.40 | 25 | heavy | no defects | | 0.53 | 0.21 |
| green gray | 0.50 | 27 | moderate | speckled bead | some herring bone | | |
| violet gray | 0.65 | 40 | heavy | speckled bead | no herring bone | 0.58 | 0.26 |

[1] Composed of about 0.10% carbon, 0.40% manganese, 0.01% silicon, balance iron.

The cast material from each heat was crushed to a screen sizing of 12 x 150. As shown in Table I the product contained metal mist to an extent depending on the energy input. With relatively low energy input the content of metal mist was small. With relatively high energy input the product contained a great deal of metal mist. The manganese and silicon content of the weld metal was found to rise with increase of energy input to the furnace as shown in Table I.

Another series of tests was made with the following materials:

FORMULA NO. II

| | Lbs. |
|---|---|
| Silica sand | 4.63 |
| Calcined bauxite | 0.25 |
| Chilean manganese ore | 5.50 |
| Belgian Congo manganese ore | 3.11 |
| Lime | 0.59 |
| Fluorspar | 0.9 |

Three heats were prepared. In Formula II (a) 3.11 lbs. of the manganese ore was added just before pouring. In Formula II (b) 2.6 lbs. of the same and in Formula II (c) 1.05 lbs. was added. A fourth heat was made with the following materials:

FORMULA NO. III

| | Lbs. |
|---|---|
| Silica sand | 5.23 |
| Calcined bauxite | 0.25 |
| Chilean manganese ore | 5.50 |
| Beligan Congo ore | 2.50 |
| Fluorspar | 0.89 |

No metal mist was observed in three heats made in accordance with Formula No. II but the fourth heat which was made in accordance with Formula No. III was fused with an energy input of 9 kw. hr. compared with 5½ kw. hr. for the first three, contained considerable metal mist. The weld metal deposited by such four heats had the following composition:

| Formula No. | II(a) | II(b) | II(c) | III |
|---|---|---|---|---|
| Manganese | 0.77 | 0.74 | 0.77 | 1.41 |
| Silicon | 0.05 | 0.07 | 0.09 | 0.40 |

The welds produced by Formulas II(a), II(b) and II(c) had many surface defects. The welds produced by Formula III had smooth surfaces free from defects and were wider than the welds produced by the first three compositions. These tests indicated that the presence of metal mist in a welding composition resulted in a good weld compared with compositions free metal mist. To repeat, the difference between securing an acceptable and unacceptable weld can be traced definitely to the presence or absence of metal mist of the invention in the welding composition.

Photomicrographs of flux from different furnace runs of the same type of composition representing different runs over a period of time show the variations that exist in distribution of metal mist. Such metal mist photomicrographs indicate that power and time are vital factors in the furnacing operation. The formation of metal mist can be controlled through furnacing techniques involving a determinate holding time after fusion of the charge components has been completed. Furnaces of a wide range of types can be used to effect the reduction. For example a cupola has been used with coke as reducing agent.

There are at least two criteria by which to judge the character of metal mist: (1) its chemical character, and (2) its physical character. Identification of the metal mist and the globules has been made by separating them by liquid medium from a finely ground sample of composition and determining their chemical composition by the X-ray diffraction method in which the patterns were matched with known diffraction patterns of ferro-alloys. The individual course metal masses (globules) ranged in size (diameter) from 2.5 microns to 250 microns with a preferred size (diameter) of about 20 microns.

Metallic mists, such as described herein, are possible only by the reduction of metallic oxides during furnacing; they could not be obtained by the addition of ferro-alloys to the furnace charge. In several attempts, additions of finely divided ferrosilicon and silicomanganese were made to the fluid composition prior to and during the tapping procedure followed by a rapid chilling of the cast product. However, in none of these attempts was the chilling sufficiently fast to retain the alloy particles in a uniformly dispersed pattern throughout the material. Is each instance, the alloy addition was found concentrated in the lower portion of the chilled product. The losses incurred through the dusting of such finely divided alloys during these operations were sufficient to make the procedure economically unfeasible.

The basis of the furnacing procedure as hereto related is the time-temperature relationship wherein temperature is a function of power plus time. It follows then that holding time affects the amount of mist in the composition by increasing the time at temperature. Actually there are two sets of reactions under consideration—(1) is that during the making of the composition from which the mist is generated, and (2) that during the using of the composition wherein the mist reacts as a deoxidizer with the oxides or other gas-generating components in the welding operation.

The method of this invention is concerned with the metal mist for the purpose of producing deoxidizers such as ferrosilicon and ferromanganese which are useful for assuring soundness of welds. Metal mists can also be useful in reducing alloying materials into the composition as ferro-alloys. There is evidence in compositions for welding alloy steel that those melts having large amounts of mist in the form of ferrochrome alloys produced higher chromium contents in welds than melts containing no mist.

Metal mist is actually a form of ferro-alloy which can vary in composition with the chemical composition of the matrix. Its occurrence results from a reduction of the more easily reducible oxides in the charge to the point of incipient metal formation and can be produced and controlled by regulation of the holding time in the furnace subsequent to the completion of the melting cycle. The metal mist, by its nature, acts as a deoxidizer during the welding operation, and its influence on the welding performance of a single grade has been demonstrated by the results of actual field tests.

The types of deoxidizing alloys occurring as metal mist can be predetermined by the choice of raw mtaerials in the charge. Furthermore, the practice can be extended to include alloying elements such as the ferrochromium type of metal mist.

To illustrate the importance of a moderate amount of evenly dispersed, microscopic globules of metal mist for satisfactory welding, the results of weld tests on three lots of welding composition are summarized in Table II. The composition of the three lots was approximately 39% $SiO_2$, 5% $CaF_2$, 12% $MnO$, 18% $TiO_2$, 5% $Al_2O_3$, 18% $CaO$, 1% $MgO$, 2% $FeO+Fe_2O_3$. Lots 2 and 3 contained metal mist in adequate amounts in accordance with the invention and produced satisfactory welds. Lot 1 having the same approximate composition as the other two lots in Table II but containing insufficient or no metal mist did not produce satisfactory welds.

Table II

| Lot | 1 | 2 | 3 |
| --- | --- | --- | --- |
| Presence of metal globules illustrated by: | Fine, widely dispersed, all substantially below 2.5 microns. | Moderate number, evenly dispersed, moderately coarse and fine (between 2.5 and 250 microns) globules. | Moderate number, evenly dispersed, coarse and fine globules. |
| Type of submerged-melt welding test. | Single electrode work-in-circuit. | Single electrode work-in-circuit. | Two electrodes in tandem, 3φ power supply. |
| Result of welding test. | Welds dull, porous, rough with slag inclusions. | Very good weld, satisfactory strength and ductility. | Good. |

The tabulated results show that adequate metal mist is required in order to secure good welds according to this invention.

As indicated previously, the metal mist encountered in the various compositions is formed in the furnace during the later stages of the melting operations by the reduction of the more easily reducible oxides in the charge to the point of incipient metal formation. The longer a charge is held at temperature in the furnace, the greater the opportunity these minute metal spheres have to coalesce, resulting in larger metallic globules. A test made on a commercial composition showed that with an identical charge, the metal mist content of the cast melt could be increased from very light metal spray in 50 percent of the particles of sized composition to moderate metal spray in all composition particles simply by increasing the time in the furnace six minutes, with a commensurate increase in power. In other words, the power for the first composition was 0.39 kw. hr. per pound of charge, and for the second composition, 0.46 kw. hr. per pound of charge with the added 0.07 kw. hr. per pound being put in at the end of the heat.

It is now apparent that the presence of metal mist in welding compositions, as a result of the invention, can account for the success or failure of any given lot on a particular type of welding application depending upon the amount formed during the furnacing operation of the material and its dispersal throughout the composition. The state of oxidation of the oxide system in a welding composition is a function of the degree of furnacing.

While the invention has been disclosed and described in great detail for use in submerged arc welding, the composition may also be suitable as a furnace slag, and for metal arc welding in which the arc is shielded with a suitable gas and the welding composition is delivered to the welding zone by means of such gas, or as the core of an electrode.

The present invention can be applied in the use of any of the several welding compositions disclosed by the Jones et al. patent referred to above, but is not limited thereto except as called for in the following claims.

What is claimed is:

1. Method of metal arc welding which comprises striking a welding arc between a consumable metal welding electrode and a steel workpiece, covering such arc and the adjacent metal with a welding composition of solid particles ranging in screen size from 4 mesh to —325 mesh, inclusive, each of which is composed of metal in the form of microscopically small masses ranging in size from 2.5 to 250 microns, inclusive, and substantially evenly distributed as a dispersion throughout a solid matrix composed of metal oxide, and melting such composition and metal with said arc, said microscopically small inclusions being released by fusion of the metal oxide matrix at a substantially uniform rate as the welding operation progresses to combine with oxygen unavoidably derived from air mixed with the composition and with oxygen derived from the surface of and from within the workpieces and electrode, leaving weld metal that is sound and of good appearance.

2. A fused metal-oxide type welding composition ranging in size from 4 mesh to —325 mesh for welding ferrous metal and alloys, each particle of which contains deoxidizing ferro alloys selected from the group consisting of ferrosilicon, ferromaganese and ferrochromium dispersed in a fused oxide matrix as microscopically small metallic inclusions having a particle size in the range of 2.5 to 250 microns, present in such amounts as to contribute to the alloy content of the weld.

3. Method of metal arc welding which comprises striking a welding arc between a consumable metal welding electrode and a steel workpiece; covering such arc and the adjacent metal with a fused metal-oxide type welding composition ranging in size from 4 mesh to —325 mesh, each particle of which contains deoxidizing ferro alloys selected from the group consisting of ferrosilicon, ferromanganese and ferrochromium dispersed in a fused oxide matrix as microscopically small metallic inclusions having a particle size in the range of 2.5 to 250 microns, present in such amounts as to contribute to the alloy content of the weld; and melting such composition and metal with said arc; said microscopically small inclusions being released by fusion of the metal-oxide matrix at a substantially uniform rate as the welding operation progresses to combine with oxygen unavoidable derived from air mixed with the composition and with oxygen derived from the surface of and from within the workpiece and electrode, leaving weld metal that is sound and of good appearance.

References Cited in the file of this patent

UNITED STATES PATENTS

| 2,680,798 | Shrubsall | June 8, 1954 |
| 2,778,724 | Moklebust | Jan. 22, 1957 |
| 2,807,562 | Shrubsall | Sept. 24, 1957 |

FOREIGN PATENTS

| 279,219 | Great Britain | Oct. 27, 1927 |